United States Patent
Boyd et al.

(10) Patent No.: US 10,139,261 B2
(45) Date of Patent: Nov. 27, 2018

(54) THROUGH WALL INSTALLATION OF SENSORS IN FUEL TANKS

(71) Applicant: Parker-Hannifin Corporation, Cleveland, OH (US)

(72) Inventors: Lewis J. Boyd, Bath (GB); Francisco Lorenzo Aparicio, Las Palmas de G.C. (ES); German Leonardo Diaz Cuevas, Bristol (GB)

(73) Assignee: Parker-Hannifin Corporation, Cleveland, OH (US)

( * ) Notice: Subject to any disclaimer, the term of this patent is extended or adjusted under 35 U.S.C. 154(b) by 605 days.

(21) Appl. No.: 14/625,079

(22) Filed: Feb. 18, 2015

(65) Prior Publication Data

US 2015/0276456 A1 Oct. 1, 2015

Related U.S. Application Data

(60) Provisional application No. 61/971,563, filed on Mar. 28, 2014.

(51) Int. Cl.
*G01F 23/14* (2006.01)

(52) U.S. Cl.
CPC ......... *G01F 23/14* (2013.01); *Y10T 29/49002* (2015.01)

(58) Field of Classification Search
CPC ........ G01F 23/14; G01N 1/10; G01N 1/2035; G01N 2001/205; G01N 2001/2057; G01N 2001/1031; G01N 2001/2035; Y10T 403/7007; F16B 21/04
USPC .......................................... 43/66.5; 403/349
See application file for complete search history.

(56) References Cited

U.S. PATENT DOCUMENTS

| | | | | |
|---|---|---|---|---|
| 2,234,056 | A | | 3/1941 | Moore |
| 3,561,487 | A | | 2/1971 | Reed, Jr. |
| 4,271,541 | A | * | 6/1981 | Mathews ................ E04H 4/169 134/167 R |
| 4,320,343 | A | * | 3/1982 | Ingram .................. G01N 27/07 324/450 |
| 4,628,732 | A | * | 12/1986 | Makinen .................. G12B 9/00 73/866.5 |
| 4,640,478 | A | * | 2/1987 | Leigh-Monstevens ..................... B60T 11/16 248/27.1 |
| 4,943,182 | A | * | 7/1990 | Hoblingre ................. F16B 7/20 403/325 |
| 5,127,276 | A | * | 7/1992 | Prentiss ............. F01M 11/0408 141/321 |

(Continued)

FOREIGN PATENT DOCUMENTS

| | | |
|---|---|---|
| CN | 202119456 | 1/2012 |
| GB | 2 115 550 | 9/1983 |

*Primary Examiner* — Peter Macchiarolo
*Assistant Examiner* — Alexander Mercado
(74) *Attorney, Agent, or Firm* — Renner, Otto, Boisselle & Sklar, LLP

(57) ABSTRACT

The present invention provides a sensor assembly for installation within an opening in a wall separating an interior cavity from an exterior. The sensor assembly includes an exterior housing and a cartridge including a sensor. When the cartridge is correctly positioned within the housing, a flow path is established from the interior cavity to the sensor supported within the cartridge. When the cartridge is not positioned within the housing, the flow path is blocked.

11 Claims, 16 Drawing Sheets

(56) References Cited

U.S. PATENT DOCUMENTS

| | | | | |
|---|---|---|---|---|
| 5,186,050 A * | 2/1993 | Lagace | ............... | B63B 17/0018 73/187 |
| 5,303,944 A * | 4/1994 | Kalmus | ................... | B62H 7/00 280/288.4 |
| 5,379,658 A | 1/1995 | Lichtenfels, II et al. | | |
| 5,402,821 A | 4/1995 | Harstad | | |
| 5,939,610 A * | 8/1999 | Iwamoto | ............... | G01N 27/283 204/416 |
| 6,131,473 A * | 10/2000 | Hoffman | ............... | G01N 17/046 73/29.01 |
| 6,490,939 B1 * | 12/2002 | Sargent | ................... | G01B 3/22 73/866.5 |
| 6,640,658 B1 * | 11/2003 | Guerrero | ................ | G01D 11/30 73/866.5 |
| 7,240,555 B2 | 7/2007 | Kawashima | | |
| 7,267,322 B1 * | 9/2007 | Luby | .................... | G01D 11/245 251/149 |
| 7,398,687 B2 | 7/2008 | Nakajima et al. | | |
| 7,594,449 B2 * | 9/2009 | Tottewitz | ............... | G01N 27/283 73/866.5 |
| 7,631,569 B2 * | 12/2009 | Salo | .................... | G01B 5/0004 73/866.5 |
| 7,784,855 B2 | 8/2010 | Faass et al. | | |
| 7,806,009 B2 * | 10/2010 | Tottewitz | ............. | G01N 27/283 73/866 |
| 7,832,295 B2 * | 11/2010 | Rodriguez | ......... | G01N 33/1886 73/170.29 |
| 8,109,132 B2 * | 2/2012 | Maurer | ................... | G01D 11/30 73/53.01 |
| 8,117,924 B2 * | 2/2012 | Joeris | .................... | C12M 33/04 422/82.08 |
| 8,210,037 B2 | 7/2012 | Christoph et al. | | |
| 8,396,631 B2 | 3/2013 | Büyükbas et al. | | |
| 8,607,399 B2 * | 12/2013 | Umbrell | ............... | B24B 45/006 15/209.1 |
| 8,631,716 B2 * | 1/2014 | Bernard | ............... | G01D 11/245 73/431 |
| 9,086,087 B1 * | 7/2015 | Sharman | ............ | A63H 33/067 |
| 9,176,060 B2 * | 11/2015 | Lee | ........................ | G01N 21/59 |
| 9,625,356 B2 * | 4/2017 | Jenkins | ................... | G01N 1/16 |
| 9,702,791 B2 * | 7/2017 | Jenkins | ................... | G01N 1/02 |
| 2005/0276658 A1 * | 12/2005 | Silva | ...................... | F16G 15/06 403/154 |
| 2006/0099838 A1 * | 5/2006 | Meyers | ................... | E02F 9/006 439/134 |
| 2012/0097557 A1 | 4/2012 | Baumfalk et al. | | |
| 2013/0269421 A1 * | 10/2013 | Tichborne | ............... | H04Q 9/00 73/53.01 |
| 2014/0053645 A1 * | 2/2014 | Ward | ...................... | G01F 23/14 73/302 |

* cited by examiner

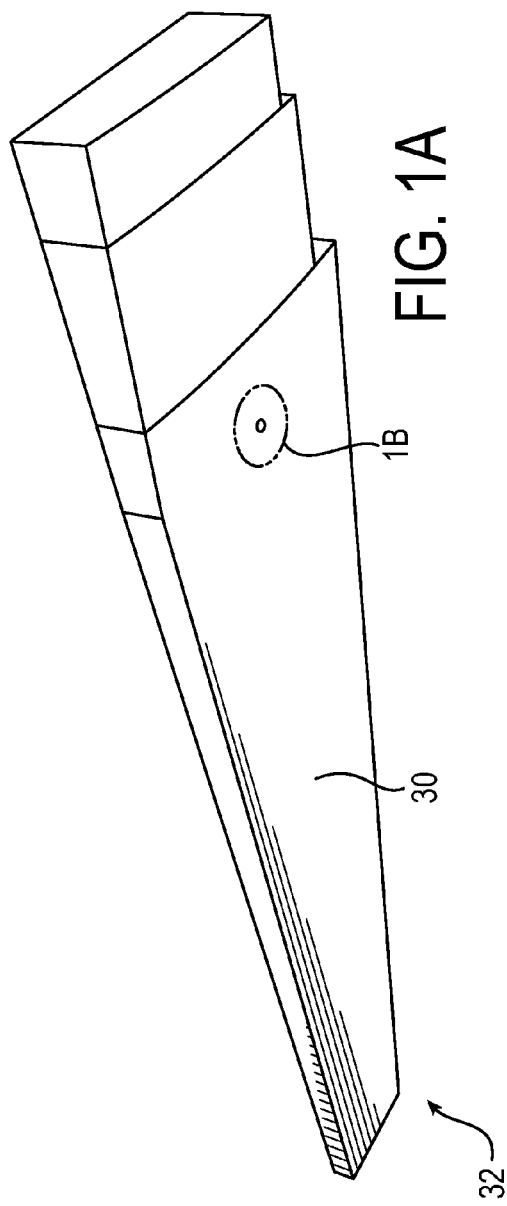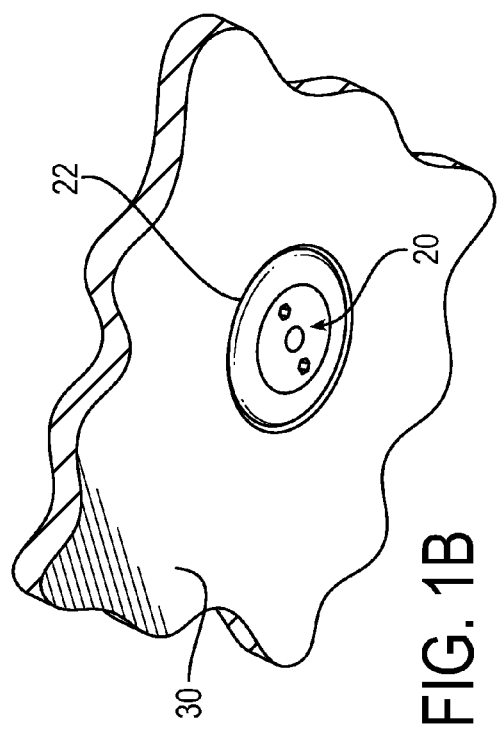

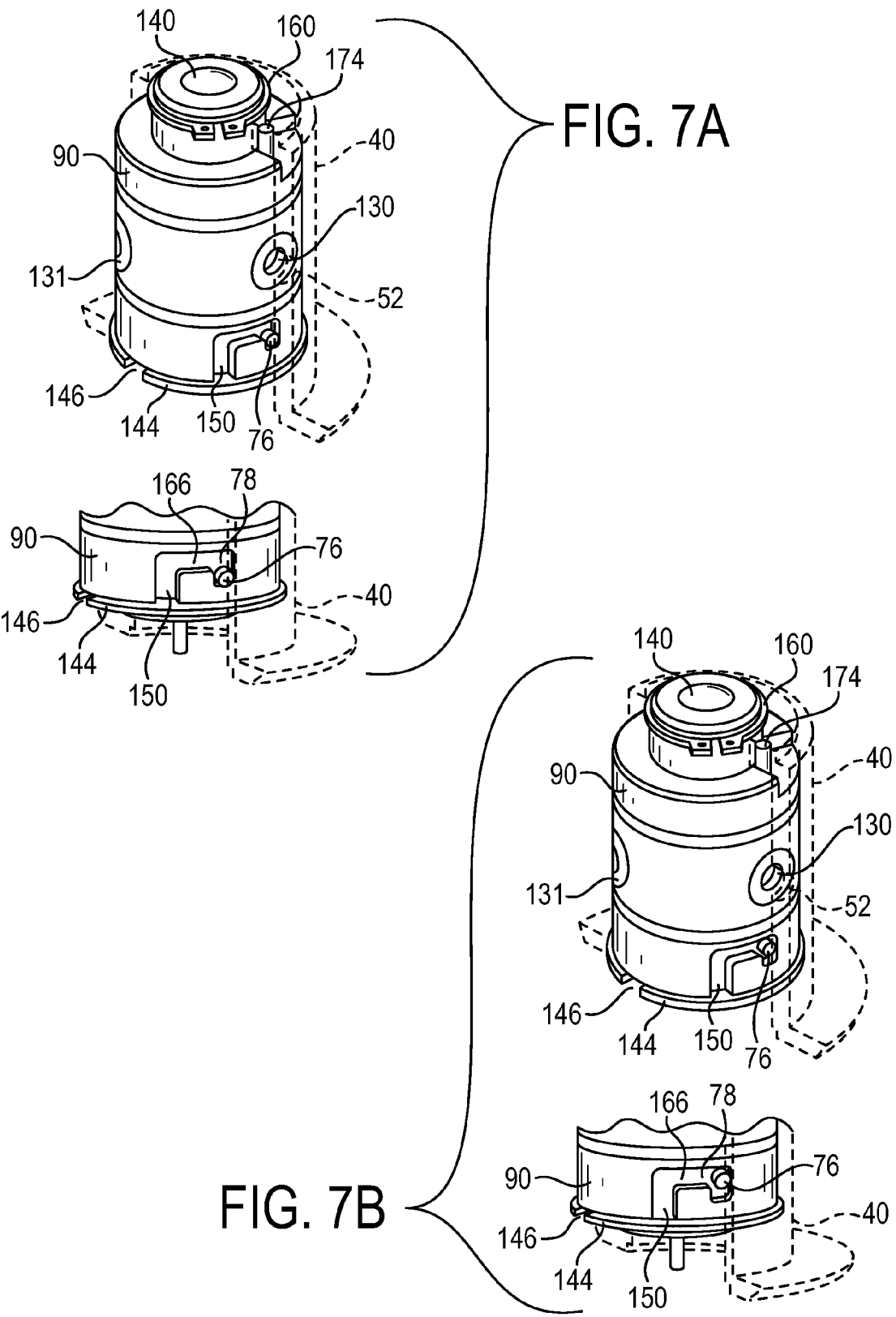

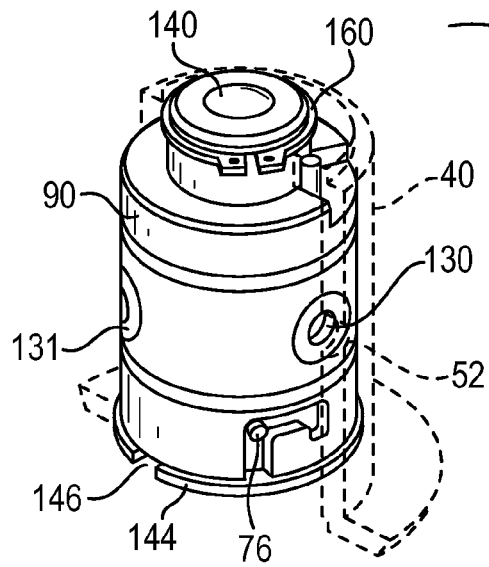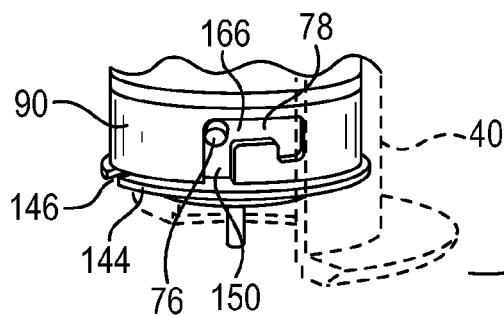
FIG. 7C
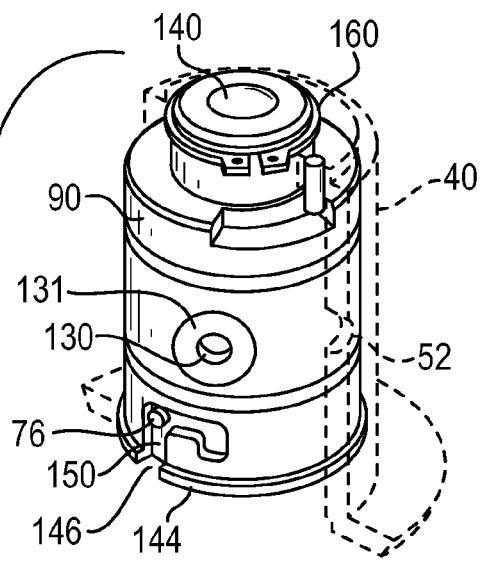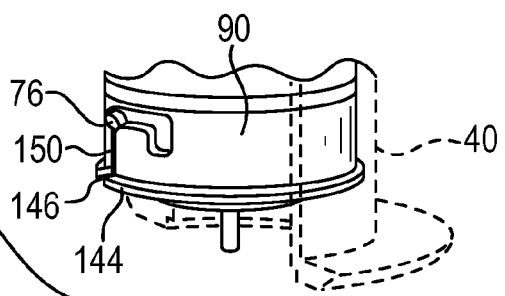
FIG. 7D

THROUGH WALL INSTALLATION OF SENSORS IN FUEL TANKS

TECHNICAL FIELD

The present invention relates generally to fuel sensor and in particular to the through wall installation of sensors in fuel.

BACKGROUND

Aircraft frequently use fuel sensors located within the fuel tank in order to monitor fuel levels. The installation of equipment into a fuel tank is normally achieved in one of two ways: full internal installation or through wall installation. Those components that are fully installed inside the fuel tanks require access to the interior of the fuel tank during installation and during maintenance operations. Through wall fuel sensors have the benefit of allowing servicing of the fuel sensor from outside of the fuel tank.

The installation of equipment through the wall of a fuel tank can be done for both permanent and removable components. Permanent components are not intended to be replaced or internally inspected during maintenance (e.g., water drains). Removable components allow servicing and replacement of parts from outside the tank without the need to drain it. In order for removable components to be replaced, the removable components must have a way to prevent the fuel from leaking out of the tank while the component is being serviced and/or is completely removed (e.g., to be replaced).

SUMMARY

The present invention provides a sensor assembly for installation within an opening in a wall separating an interior cavity from an exterior. The sensor assembly includes a housing and a cartridge that interact, so that when the cartridge is positioned in a flow position within the housing, a flow path from the interior cavity to a sensor supported within the cartridge is opened. When the cartridge is positioned in an intermediate position within the housing, the flow path from the interior cavity to the sensor supported within the housing is closed. When the cartridge is not positioned within the housing, the flow path is also closed.

According to one aspect of the disclosure, there is provided a sensor assembly for installation within an opening in a wall separating an interior cavity from an exterior. The sensor assembly includes a housing including an interior space. The housing is configured to be received within the opening in the wall such that at least one housing aperture in a wall of the housing communicates with the interior cavity. The housing aperture is configured such that a flow path through the housing aperture between the interior cavity and the housing interior space is blocked when a cartridge is not positioned within the housing interior space. The housing aperture is also configured such that the flow path through the housing aperture between the interior cavity and the housing interior space is established when the cartridge is positioned in a flow position within the housing interior space. A cartridge is configured to be received within the housing. The cartridge includes a sensor supported within a central recess of the cartridge and the sensor is disposed within the housing interior space when the cartridge is positioned within the housing interior space. The cartridge also includes at least one cartridge aperture positioned such that a flow path through the cartridge aperture is established between the housing interior space and the sensor when the cartridge is positioned within the housing interior space. The sensor assembly also includes a base retaining device configured to retain the cartridge within the housing.

Alternatively or additionally, the sensor assembly additionally includes a poppet positioned within the housing interior space and a poppet retaining member. The poppet retaining member is configured to, when the cartridge is not positioned within the housing interior space, maintain a position of the poppet such that the flow path through the housing aperture between the interior cavity and the housing interior space is blocked. The poppet retaining member is also configured to, when the cartridge is positioned in the flow position within the housing interior space, permit the position of the poppet to be biased by the cartridge such that the flow path through the housing aperture between the interior cavity and the housing interior space is established.

Alternatively or additionally, the base retaining device comprises a bayonet pin located along an exterior surface of the cartridge and a slot positioned on an interior surface of the housing and configured to receive the bayonet pin. The geometry of the slot is configured to allow the cartridge to rotate through a predetermined angle within the housing, such that, in the flow position, the cartridge is retained within the housing and, in a removal position, the bayonet pin aligns with an opening in the slot, allowing the cartridge to be removed from the housing.

Alternatively or additionally, the sensor assembly further includes a stator disposed within the housing and rotatable between a closed position and an open position. The stator is positioned between a proximal portion of the housing interior space and a distal portion of the housing interior space. The stator includes a stator aperture. The distal portion of the housing interior space includes an interior housing aperture establishing a flow path between the distal portion of the housing interior space and the stator. The cartridge is configured to be received within the proximal portion of the housing interior space. The stator is rotatable and the stator aperture is positioned such that, in the open position, the stator aperture is in alignment with the interior housing aperture and the at least one cartridge aperture such that a flow path is established between the proximal portion of the housing interior space and the sensor. The stator is rotatable and the stator aperture is positioned such that, in the closed position, the stator aperture is out of alignment with the interior housing aperture such that the flow path between the proximal portion of the housing interior space and the sensor is blocked.

Alternatively or additionally, the cartridge includes a distal surface having a keyed shape that is configured to engage with a proximal surface of the stator such that, when the distal surface of the cartridge is in contact with the proximal surface of the stator, rotation of the cartridge results in rotation of the stator.

Alternatively or additionally, a push bar is positioned between the stator and the poppet such that movement of the cartridge along a central axis passing through the stator and the poppet results in a corresponding movement of the poppet.

Alternatively or additionally, the base retaining device comprises a bayonet pin located along an exterior surface of the cartridge and a slot positioned on an interior surface of the housing and configured to receive the bayonet pin. The geometry of the slot configured to allow the cartridge to rotate through a predetermined angle within the housing, such that, in the flow position, the cartridge is retained within the housing and, in a removal position, the bayonet pin aligns with an opening in the slot, allowing the cartridge to be removed from the housing.

Alternatively or additionally, the sensor assembly further includes a seal included in the distal portion of the housing interior space and positioned to engage the stator. The seal is configured to limit fluid flow between the distal portion and the proximal portion of the housing interior space to occurring through the stator aperture. The sensor assembly additionally includes a biasing member configured to bias the seal towards the stator.

Alternatively or additionally, the sensor assembly additionally including a stator disposed within the housing and rotatable between a closed position and an open position. The stator includes a central cavity and a stator aperture through a sidewall of the stator. The stator aperture is located such that, in the open position, the stator aperture is in alignment with the housing aperture such that a flow path is established between the interior cavity and the stator central cavity. The stator aperture is also located such that, in the closed position, the stator aperture is out of alignment with the housing aperture such that the flow path between the interior cavity and the stator central cavity through the stator aperture and the housing aperture is blocked. The stator central cavity is configured to receive the cartridge. The at least one cartridge aperture is positioned to be aligned with the stator aperture, such that a flow path is established through the stator aperture between the housing interior space and the sensor located within the cartridge central recess.

Alternatively or additionally, the stator additionally includes at least one vent valve positioned along a portion of the stator projecting outwardly through the opening in the end wall of the housing and the vent valve is configured to allow air within the housing to vent through the vent valve.

Alternatively or additionally, the base retaining device comprises a split ring including a split, a bayonet pin located along an exterior surface of the cartridge, and a slot positioned on an interior surface of the stator and configured to receive the bayonet pin. The geometry of the slot is configured to allow the cartridge to rotate through a predetermined angle within the stator, such that, in the flow position, the cartridge is retained within the housing and, in a removal position, the bayonet pin aligns with an opening in the slot and the split in the split ring, allowing the cartridge to be removed from the housing.

Alternatively or additionally, the sensor assembly is configured such that, when the cartridge is positioned in the flow position, the stator is located in the open position. The sensor assembly is configured such that, as the cartridge is rotated from the flow position towards the removal position, the stator is rotated along with the cartridge such that the stator reaches the closed position and, prior to the cartridge reaching the removal position, the flow path between the interior cavity and the stator central cavity through the stator aperture and the housing aperture is blocked.

Alternatively or additionally, the sensor assembly also includes a compression member positioned between the stator and the cartridge, the compression member configured to bias the cartridge away from the end wall of the housing and toward the base retaining device.

Alternatively or additionally, the housing includes a stop to limit a rotational range of the stator with respect to the housing.

Alternatively or additionally, the sensor outputs data via a wired connection. The wired connection includes a transmission wire passing directly from the sensor assembly to the interior cavity or the exterior.

Alternatively or additionally, a position of the housing within the opening in the wall separating the interior cavity and the exterior is maintained by a fastener and an exterior surface of the housing is threaded and configured to engage with a threaded interior surface of the fastener.

Alternatively or additionally, the sensor assembly also includes an end cap. The end cap is configured to cover the opening in the wall when inserted such that an exterior surface of the end cap and the wall are essentially flush.

According to another aspect of the disclosure, there is provided an aircraft comprising a fuel tank and a sensor assembly installed in an opening in a wall of the fuel tank separating an interior cavity of the fuel tank from an exterior of the fuel tank.

According to still another aspect of the disclosure, there is provided a method for replacing a fuel level sensor in a sensor assembly located within an opening in a wall of an aircraft fuel tank separating an interior cavity of the fuel tank from an exterior of the fuel tank. The method includes rotating a cartridge of the sensor assembly through a predetermined angle within a housing retaining the cartridge such that a bayonet pin located on an exterior surface of the cartridge aligns with an opening in a slot located on an interior surface of the housing. The method additionally includes sliding the cartridge out of the housing such that a flow path between the interior cavity and the sensor through an aperture in the housing is blocked. The method further includes inserting a replacement cartridge including a replacement sensor into the housing such that a replacement bayonet pin located on an exterior surface of the replacement cartridge aligns with the opening in the slot located on the interior surface of the housing. The method also includes sliding the replacement cartridge into the housing such that the flow path between the interior cavity and the sensor through the aperture in the housing is established. The method additionally includes rotating the replacement cartridge through the predetermined angle within the housing such that the position of the replacement cartridge within the housing is maintained by the replacement bayonet pin.

According to an additional aspect of the disclosure, there is provided an aircraft fuel level sensor assembly installed within an opening in a wall of an aircraft fuel tank separating an interior cavity of the aircraft fuel tank from an exterior. The sensor assembly includes a housing including a housing interior space. The housing is configured to be received within the opening in the wall such that at least one housing aperture in a wall of the housing communicates with the interior cavity. The housing aperture is configured such that a fluid flow path allowing fuel to pass from the interior cavity, through the housing aperture, and into the housing interior space is blocked when the cartridge is not positioned within the housing interior space. The housing aperture is also configured such that the fluid flow path allowing fuel to pass from the interior cavity, through the housing aperture, and into the housing interior space is established when the cartridge is positioned in a flow position within the housing interior space. The sensor assembly also includes a cartridge configured to be received within the housing and including at least one pressure sensor supported within a central recess of the cartridge. The at least one pressure sensor outputs pressure data regarding a pressure of the fuel located within the aircraft fuel tank. The cartridge additionally includes at least one cartridge aperture positioned such that a fluid flow path of the fuel through the cartridge aperture is established between the housing interior space and the sensor when the cartridge is positioned within the housing interior space. The sensor assembly further includes a base retaining device configured to retain the cartridge within the housing. The sensor assembly also includes an end cap. The end cap is configured to cover the opening in the wall when inserted such that an exterior surface of the end cap and the wall are essentially flush.

A number of features are described herein with respect to embodiments of the invention; it will be appreciated that features described with respect to a given embodiment also may be employed in connection with other embodiments.

The invention includes the features described herein, including the description, the annexed drawings, and, if appended, the claims, which set forth in detail certain illustrative embodiments. These embodiments are indicative, however, of but a few of the various ways in which the principles of the invention may be employed.

BRIEF DESCRIPTION OF THE DRAWINGS

FIG. 1A depicts an exterior view of an aircraft fuel tank in which a sensor assembly has been installed.

FIG. 1B shows a close-up view of the sensor assembly installed in the aircraft fuel tank as viewed from the exterior of the aircraft fuel tank of FIG. 1A.

FIGS. 7A-7E are partial cross-section views of the sensor assembly of FIG. 4 during the process of removing the cartridge from the sensor assembly.

DETAILED DESCRIPTION

The present invention provides a sensor assembly for installation within an opening in a wall separating an interior cavity from an exterior. The sensor assembly includes a housing and a cartridge including a sensor. When the cartridge is correctly positioned within the housing, a flow path is established from the interior cavity to the sensor supported within the cartridge. When the cartridge is not positioned within the housing, the flow path is blocked. In this way, the flow path may be blocked when the cartridge is removed, allowing maintenance of the sensor while maintaining any fluid in the interior cavity.

Figure 1C:
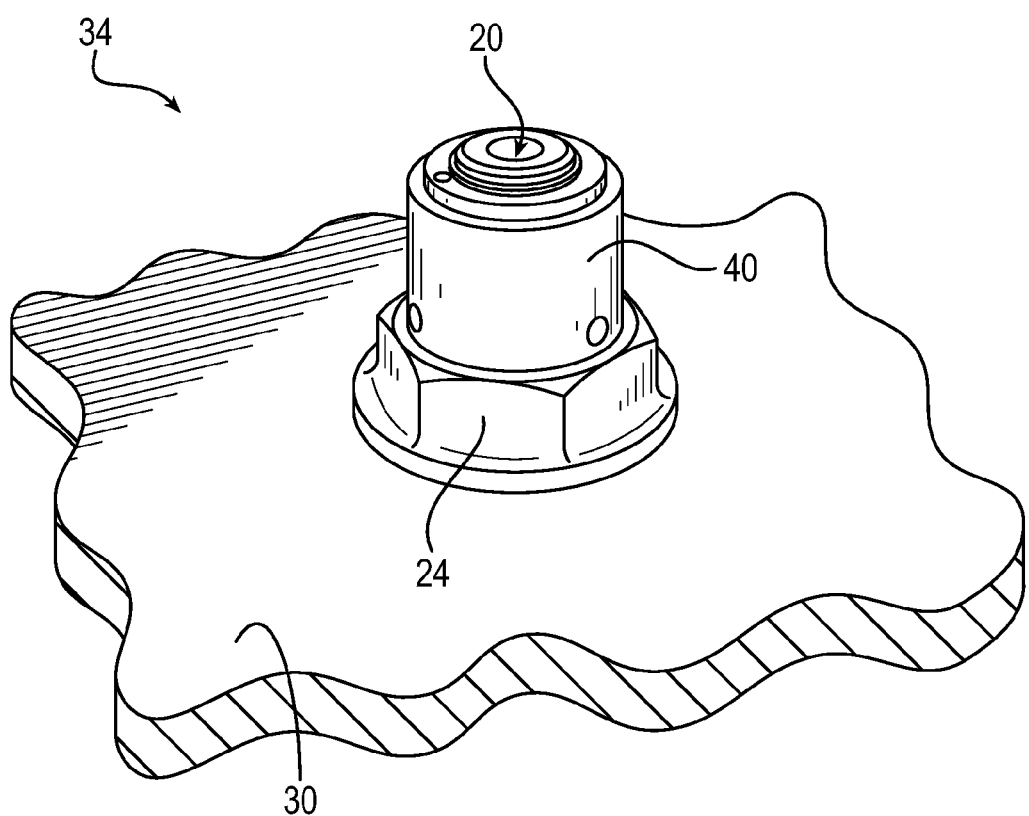
FIG. 1C shows the sensor assembly of FIG. 1B as viewed from the interior of the aircraft fuel tank of FIG. 1A.

Turning to FIG. 1A-1C, the sensor assembly 20 is shown installed within an opening 22 in a wall 30 (e.g., of an aircraft wing). The sensor assembly 20 may be installed such that the sensor assembly 20 is essentially flush with the external surface of wall 30. In this way, when the sensor assembly 20 is installed in an aircraft wing, the sensor assembly 20 may not affect airflow across the external surface of the wall 30 (e.g., the wall 30 may form a portion of an aircraft wing).

Figure 2A:
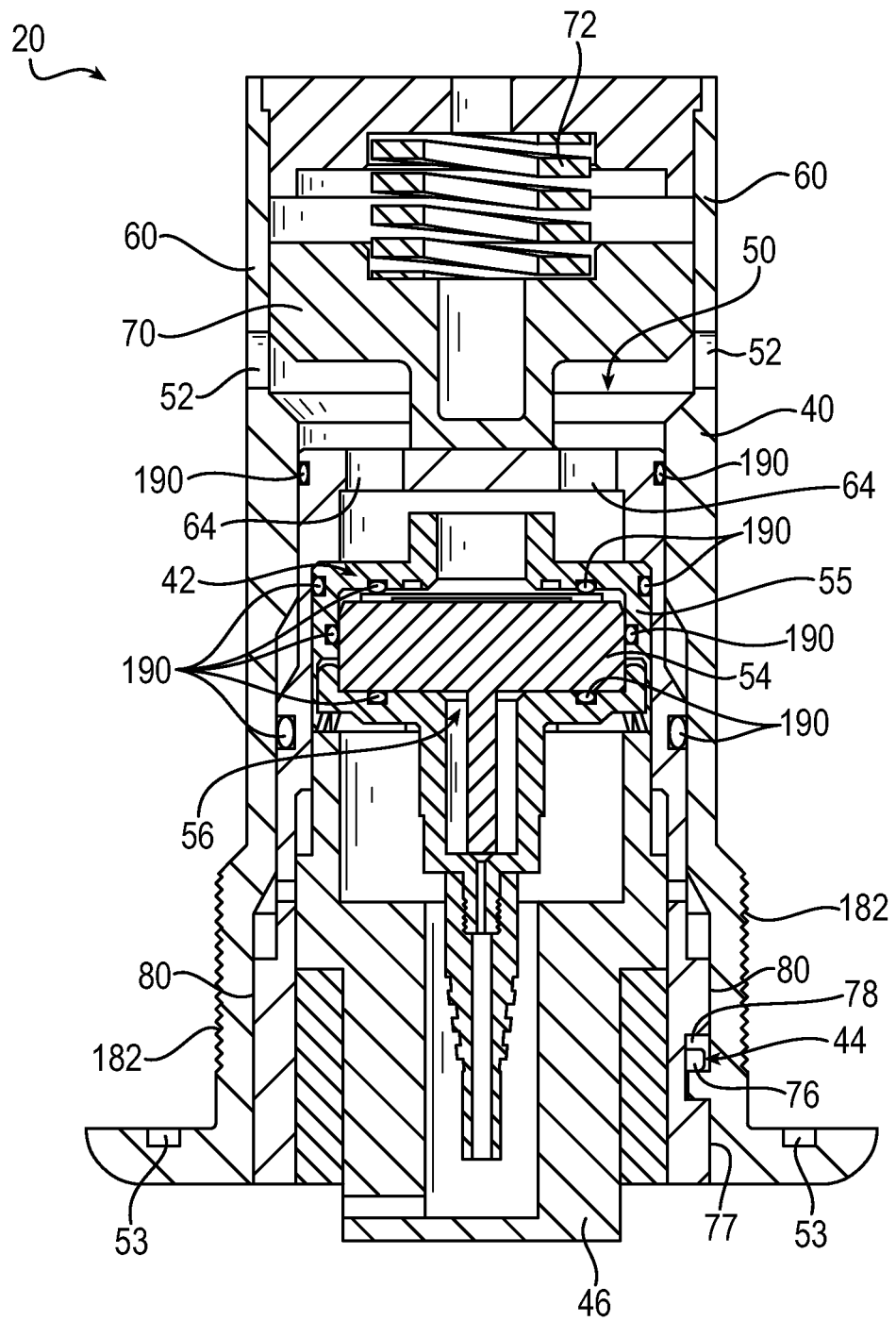
FIG. 2A is a cross-section view of a first embodiment of the sensor assembly.

Turning to FIG. 2A, a first embodiment of the sensor assembly 20 is shown. The sensor assembly 20 includes a housing 40, a cartridge 42, and a base retaining device 44. The sensor assembly 20 may also include an end cap 46. The housing 40 includes an interior space 50 and at least one housing aperture 52. The housing aperture 52 provides a flow path from the interior cavity 34 to the housing interior space 50. The cartridge 42 includes a sensor 54 located within a central recess 56 of the cartridge 42. The sensor 54 provides data regarding the properties of the environment within the cartridge central recess 56. For example, the sensor 54 may output data regarding the pressure, temperature, or other properties of fluid in the cartridge central recess 56. The flow path from the interior cavity 34 into the housing interior space 50 is blocked when the cartridge 42 is not positioned within the housing interior space 50. Blocking the flow path when the cartridge 42 is not positioned within the housing interior space 50 allows the cartridge 42 to be removed and replaced without emptying the interior cavity 34. As will be understood by one of ordinary skill in the art, while the central recess 56 is depicted in the figures as centred about a central axis of the cartridge 42, the central recess 56 is not limited in position to being centred about the central axis of the cartridge 42.

As shown in FIGS. 1A-1C, the sensor assembly 20 is installed within an opening 22 in a wall 30 separating an interior cavity 34 from an exterior 32. The opening 22 may be a round hole on a flat surface of the wall 30. In the depicted embodiment, the sensor assembly 20 is installed in the fuel tank of an aircraft located in the wing of the aircraft. A position of the housing 40 within the opening in the wall 30 separating the interior cavity 34 and the exterior 32 is maintained by a fastener 24. As shown in FIG. 2A, an exterior surface 182 of the housing 40 may be threaded and configured to engage with a threaded interior surface of the fastener 24. The fastener 24 may comprise a nut or any other suitable device for maintaining the position of the sensor assembly 20 relative to the opening in the wall 30. Suitable seals 53 may be used to prevent leakage between the housing 40 and an exterior surface of the wall 30.

Turning back to FIG. 2A, the housing 40 is configured to be received within the opening 22 in the wall 30, such that at least one housing aperture 52 in a wall 60 (e.g., a sidewall) of the housing 40 communicates with the interior cavity 34. The housing aperture 52 is configured such that the flow path through the housing aperture 52 between the interior cavity 34 and the housing interior space 50 is blocked when the cartridge 42 is not positioned within the housing interior space 50. Alternatively, when the cartridge 42 is positioned in a flow position within the housing interior space 50 (FIG. 2A), the flow path is established through the housing aperture 52 between the interior cavity 34 and the housing interior space 50. The flow path through the housing aperture 52, e.g., allows fluid in the interior cavity 34 to enter the housing interior space 50. For example, the cartridge 42 may be positioned partially (or entirely) within the housing 40 in an intermediate position. In this position (i.e., in the intermediate position and not in the flow position), the flow path through the housing aperture 52 between the interior cavity 22 and the housing interior space 50 is blocked.

With further reference to FIG. 2A, the cartridge 42 is configured to be received within the housing 40. The cartridge 42 includes the sensor 54 supported within the central recess 56 of the cartridge 42. When the cartridge 42 is positioned within the housing interior space 50, the sensor 54 is disposed within the housing interior space 50. The cartridge also includes at least one cartridge aperture 64. When the cartridge 42 is positioned within the housing interior space 50, the cartridge aperture 64 is positioned such that a flow path through the cartridge aperture 64 is established between the housing interior space 50 and the sensor 54 located within the cartridge central recess 56.

The sensor 54 is installed inside the cartridge 42 and the two may form a replaceable part for maintenance purposes. That is, a technician could replace both the sensor 54 and the cartridge 42 as a unit. Replacement of the sensor 54 and cartridge 42, e.g., may be required due to malfunction of the sensor 54 or due to the sensor 54 approaching its expected life span. The sensor 54 may be contained within a sensor housing 55 that is contained within the cartridge 42.

The sensor assembly 20 may also include an end cap 46 to provide mechanical redundancy should one of the internal components of the sensor assembly 20 become loose. In this way, the end cap 46 would act as a containment barrier, preventing items within the sensor assembly 20 from falling out and into the exterior 32. The end cap 46 may also be configured to cover the opening 22 in the wall 30 when inserted such that an exterior surface 184 of the end cap 46 and the wall 30 are essentially flush. The end cap 46, when fully installed, is essentially flush with the exterior surface of the wall 30 in order to avoid interfering with airflow across the exterior surface of the wall 30. Essentially flush may mean that the surface of the end cap 46 is at most 1 mm or 5 mm above or below the exterior surface of the wall 30.

When the cartridge is positioned in the flow position, the flow path through the housing aperture 52 is established, allowing fluid flow into the housing interior space 50 via the housing aperture 52. The fluid is then permitted to flow into the cartridge central recess 56 via the cartridge aperture 64. Once in the cartridge central recess 56, properties of the fluid (e.g., pressure) may be sensed by the sensor 54.

Once positioned in the housing, the base retaining device 44 retains the cartridge 42 within the housing 40. As described below, the base retaining device 44 may retain the cartridge 42 in a removable manner, such that the cartridge 42 is removable without requiring tools.

The sensor 54 may be a pressure sensor. In one example, the sensor 54 is a passive, optical combined pressure and temperature sensor. As will be understood by one of ordinary skill in the art, the sensor may comprise any suitable type of sensor for sensing any suitable parameter. For example, the sensor may be a pressure sensor and/or a temperature sensor.

The first embodiment of the sensor assembly 20 shown in FIG. 2A includes a poppet 70 positioned within the housing interior space 50. The position of the poppet 70 is maintained by a poppet retaining member 72. When the cartridge 42 is not positioned within the housing interior space 50, the poppet retaining member 72 is configured to maintain a position of the poppet 70 such that the flow path through the housing aperture 52 between the interior cavity 34 and the housing interior space 50 is blocked. Alternatively, when the cartridge 42 is positioned in the flow position within the housing interior space 50, the poppet retaining member 72 is configured to permit the position of the poppet 70 to be biased by the cartridge 42 such that the flow path is established through the housing aperture 52 between the interior cavity 34 and the housing interior space 50.

Figure 2B:
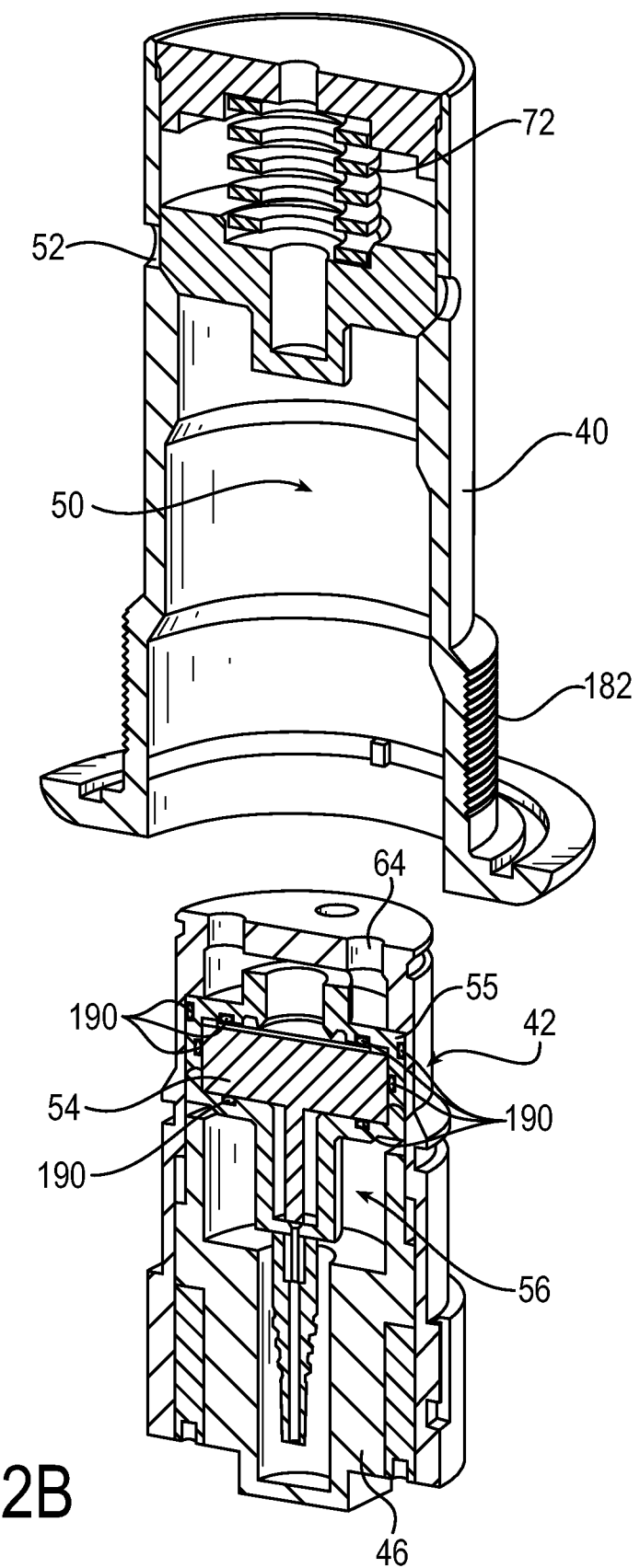
FIG. 2B is a cross-section view of the first embodiment of the sensor assembly of FIG. 2A in which the cartridge is removed from the housing.

In the exemplary embodiment shown in FIGS. 2A and 2B, the sensor assembly 20 may be installed in a fuel tank such that the cartridge 42 is removable without requiring the fuel tank to be emptied. That is, the cartridge 42 may be removed from the housing 40 as shown in FIG. 2B without resulting in the loss of significant portions of the fuel located within the fuel tank. The sensor assembly 20 may be installed through, e.g., a fuel tank inspection hatch. The sensor assembly 20 may be installed either on a modified original hatch or a custom made replacement hatch. The flow of fuel through the housing aperture 52 and out of the fuel tank is prevented by the poppet 70. As shown in FIG. 2B, when the cartridge 42 is removed from the housing 40, the poppet retaining member 72 applies a force to (e.g., pushes) the poppet 70 such that that the poppet 70 blocks the flow path through the housing aperture 52. This blocks further fluid flow from the interior space 34 through the housing aperture 52 and into the housing interior space 50. Blocking fluid flow through the housing aperture 52 may include a complete block of fluid flow into the housing interior space 50. Alternatively, blocking fluid flow through the housing aperture 52 may still allow a small leakage of fluid into the housing interior space 50. A small leakage may comprise not more than a 1 L per hour, 5 L per hour, or 10 L per hour flow of fluid out of the interior cavity 34 and through the sensor assembly 20.

As described previously, the cartridge 42 is retained in the housing 40 by the base retaining device 44. The base retaining device 44 may include a bayonet pin 76 located along an exterior surface 77 of the cartridge 42. The bayonet pin 76 may be received by a slot 78 positioned on an interior surface 80 of the housing 40. The geometry of the slot 78 may be configured to allow the cartridge 40 to rotate through a predetermined angle within the housing 40. Rotation of the cartridge 40 through the predetermined angle includes rotating the cartridge 42 between the flow position (shown in FIG. 2A) and a removal position. In the flow position, the cartridge 42 is retained within the housing 40. In the removal position, the bayonet pin 76 aligns with an opening in the slot 78, allowing the cartridge 42 to be removed from the housing 40. Further description of the bayonet pin 76 is provided below.

While the base retaining device 44 may be described in this disclosure as including a bayonet pin 76, as will be understood by one of ordinary skill in the art, the base retaining device 76 may alternatively include additional devices or structures in order to maintain the cartridge 42 in the housing 40 in a removable manner. For example, the base retaining device 44 may include clips, circlips, screws, a threaded interface, etc. Similarly, the bayonet pin 76 is not limited to being located along an exterior surface 77 of the cartridge 42 and the slot 78 is not limited to being positioned on an interior surface 80 of the housing 40. For example, the bayonet pin 76 may instead be located on an interior surface 80 of the housing 40 and the slot 78 may be positioned on an exterior surface 77 of the cartridge 42.

Figure 3A:
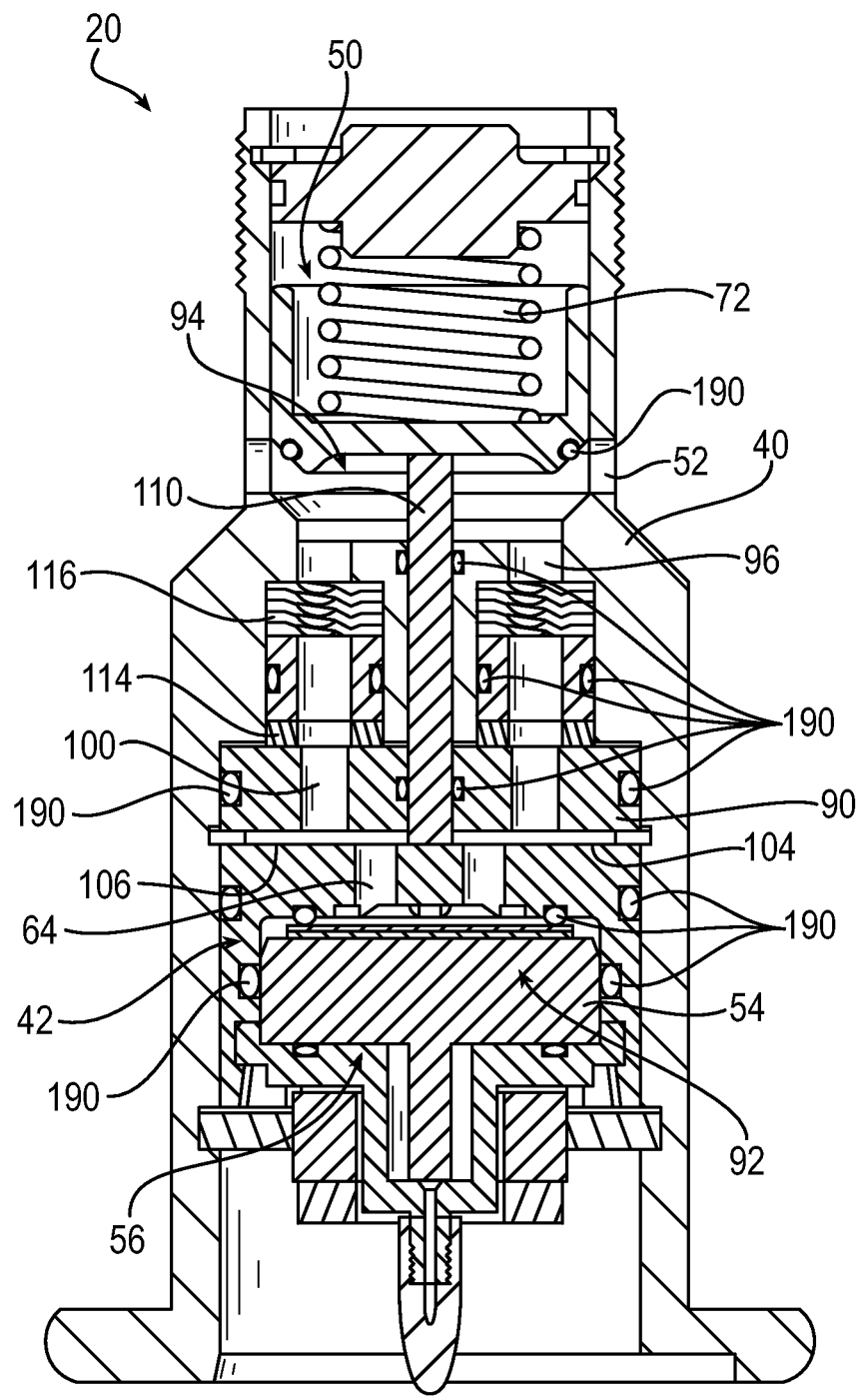
FIG. 3A is a cross-section view of a second embodiment of the sensor assembly in an open position.
Figure 3B:
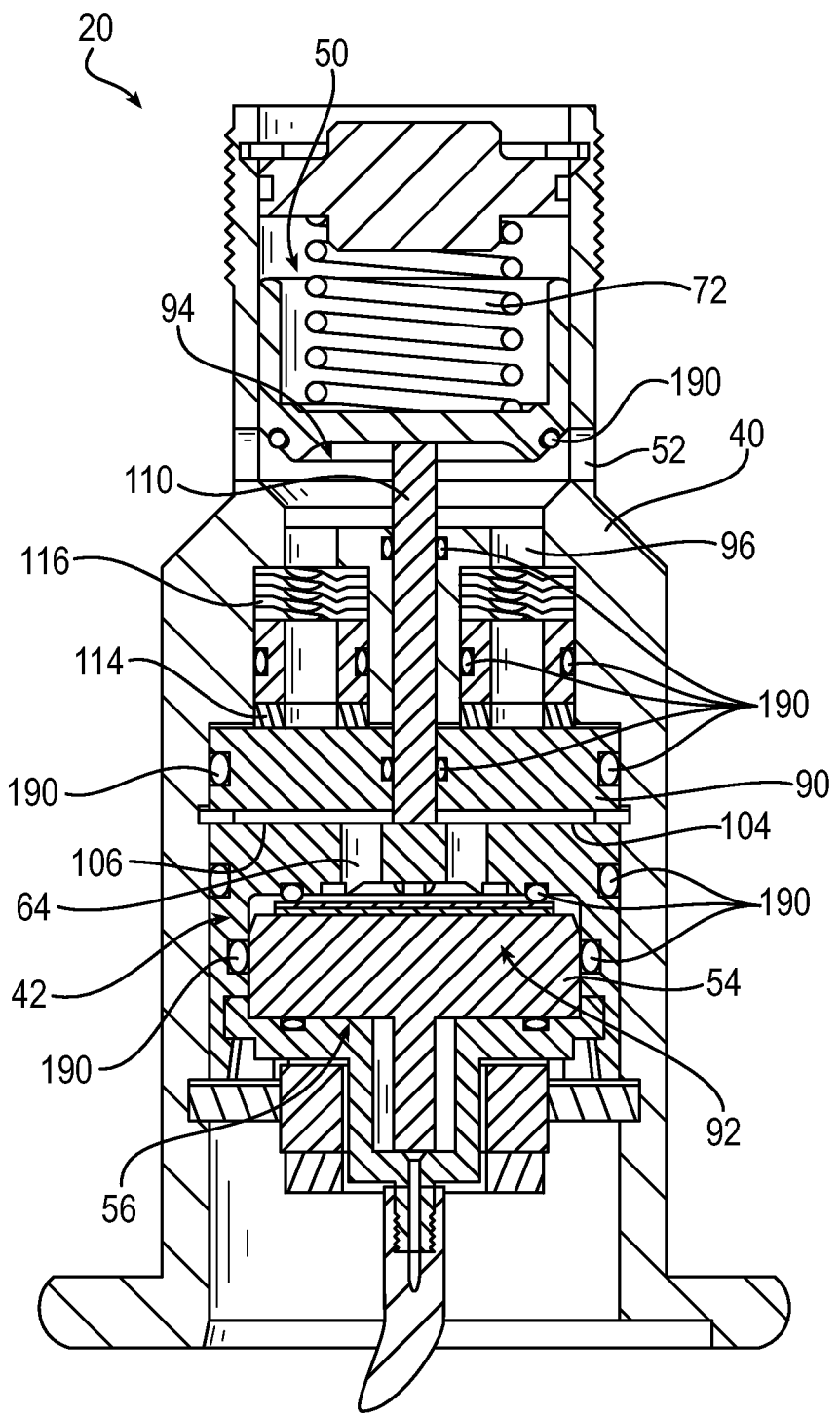
FIG. 3B is a cross-section view of the sensor assembly of FIG. 3A in a closed position.
Figure 3C:
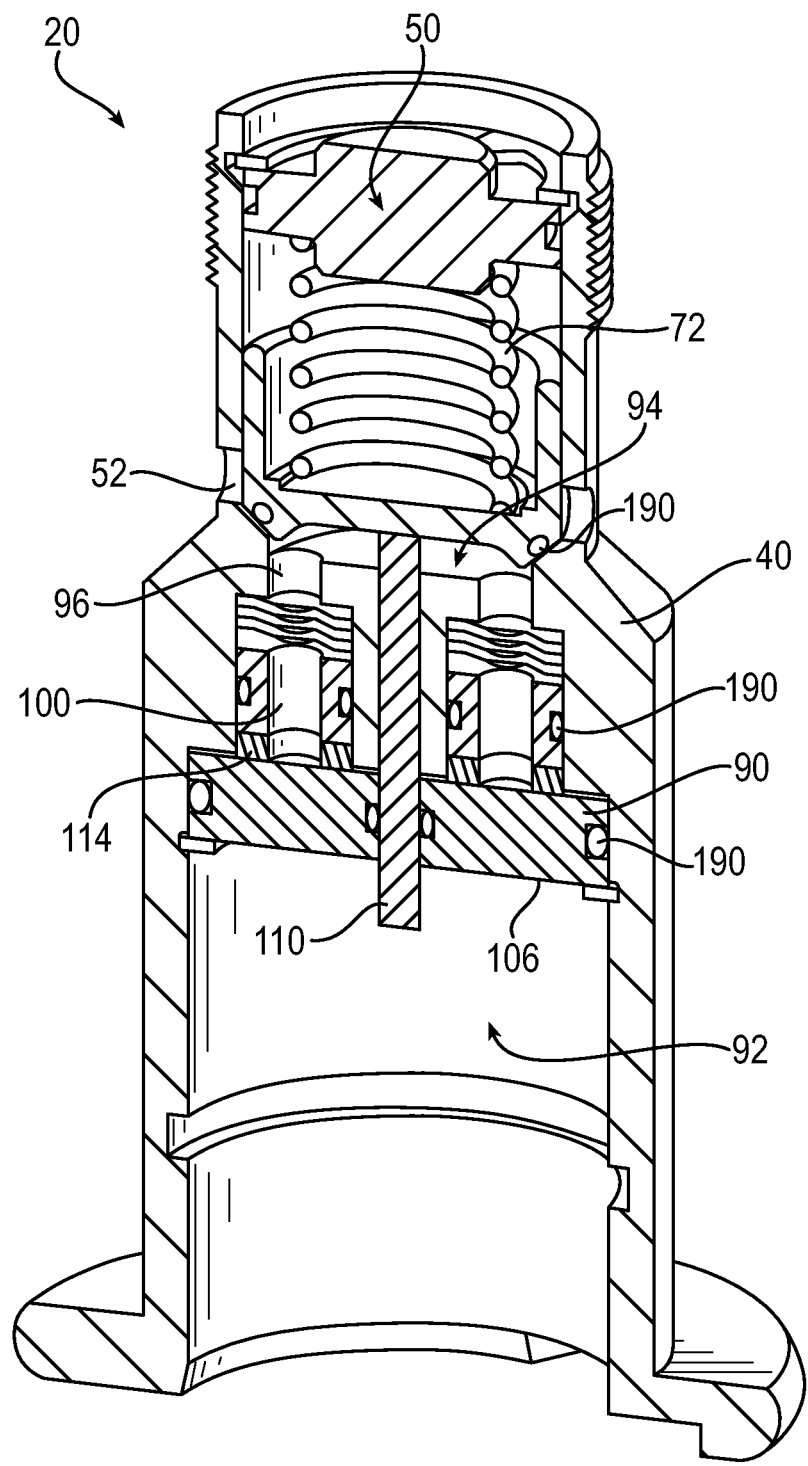
FIG. 3C is a cross-section view of the sensor assembly of FIG. 3A with the cartridge removed from the housing.

In a second embodiment shown in FIGS. 3A-3C, the sensor assembly 20 includes the poppet 70, poppet retaining device 72, and a stator 90. The stator 90 is disposed within the housing 40 and is positioned between a proximal portion 92 of the housing interior space 50 and a distal portion 94 of the housing interior space 50. The proximal portion 92 of the housing interior space 50 is configured to receive the cartridge 42. The distal portion 94 of the housing interior space 50 includes an interior housing aperture 96 establishing a flow path between the distal portion 94 of the housing interior space 50 and the stator 90.

The stator 90 is rotatable within the housing 40 between a closed position (FIG. 3B and 3C) and an open position (FIG. 3A). The stator includes a stator aperture 100 positioned such that, in the open position, the stator aperture 100 is in alignment with the interior housing aperture 96 and the at least one cartridge aperture 64 such that a flow path is established between the distal portion 94 of the housing interior space 50 and the sensor 54 located within the proximal portion 92 of the housing interior space 50. In the closed position, the stator aperture 100 is positioned such that the stator aperture 100 is out of alignment with the interior housing aperture 96 and the flow path between the distal portion 94 of the housing interior space 50 and the sensor 54 is blocked.

The cartridge 42 may also include a distal surface 104 having a keyed shape that is configured to engage with a proximal surface 106 of the stator 90. The proximal surface 106 and distal surface 104 engage such that, when the distal surface 104 of the cartridge 42 is in contact with the proximal surface 106 of the stator 90, rotation of the cartridge 42 results in rotation of the stator 90. In this way, it is possible to rotate the stator 90 from the open position (FIG. 3A) to the closed position (FIG. 3B and 3C) by rotating the cartridge 42.

The distal surface 104 and the proximal surface 106 may have complementary shapes that engage one another. For example, the distal surface 104 may include rods that engage with holes in the proximal surface 106. Alternatively or additionally, the distal surface 104 may include a raised shape that engages with a complementary indentation in the proximal surface 106.

The housing 40 may additionally include a push bar 110 that is positioned between the stator 90 and the poppet 70. The push bar 110 may be positioned such that movement of the cartridge 42 along a central axis passing through the stator 90 and the poppet 70 results in a corresponding movement of the push bar 110 and the poppet 70. For example, referring to the orientation of the housing in FIGS. 3A-3C, inserting the cartridge 42 into the housing 40 causes the push bar 110 to move in the same direction as the cartridge 42 (i.e., upward). When a cartridge 42 is not positioned within the housing 40 (FIG. 3C), the poppet retaining member 72 applies a force to the poppet 70 in order to close the flow path through the housing aperture 52 (FIG. 3C). This movement of the poppet 70 also moves the push bar 110 in the same direction (i.e., downwards in FIG. 3C).

The sensor assembly 20 may also include a seal 114 included in the distal portion 94 of the housing interior space 50. The seal 114 is positioned to engage the stator 90 in order to limit fluid flow between the distal portion 94 and the proximal portion 92 of the housing interior space 50 to occurring through the stator aperture 96. That is, when the stator 90 is in a closed position (FIG. 3B), the seal 114 limits fluid flow between the proximal portion 92 and distal portion 94 of the housing interior space 50. The "limited fluid flow" may refer to a lack of fluid flow between the portions 92, 94 of the housing interior space 50. Alternatively, the "limited fluid flow" may refer to a small amount of fluid flow between the portions 92, 94 of the housing interior space 50.

The sensor assembly 20 may further include a biasing member 116 positioned between the poppet 70 and the seal 114. The biasing member 116 is configured to bias the seal 114 towards the stator 90. In this way, the biasing member 116 may apply a force to the seal 114 and aid in limiting fluid flow between the distal portion 94 and the proximal portion 92 of the housing interior space 50 to occurring through the stator aperture 96. That is, preventing fluid leakage between the seal 114 and the stator 90.

Figure 4:
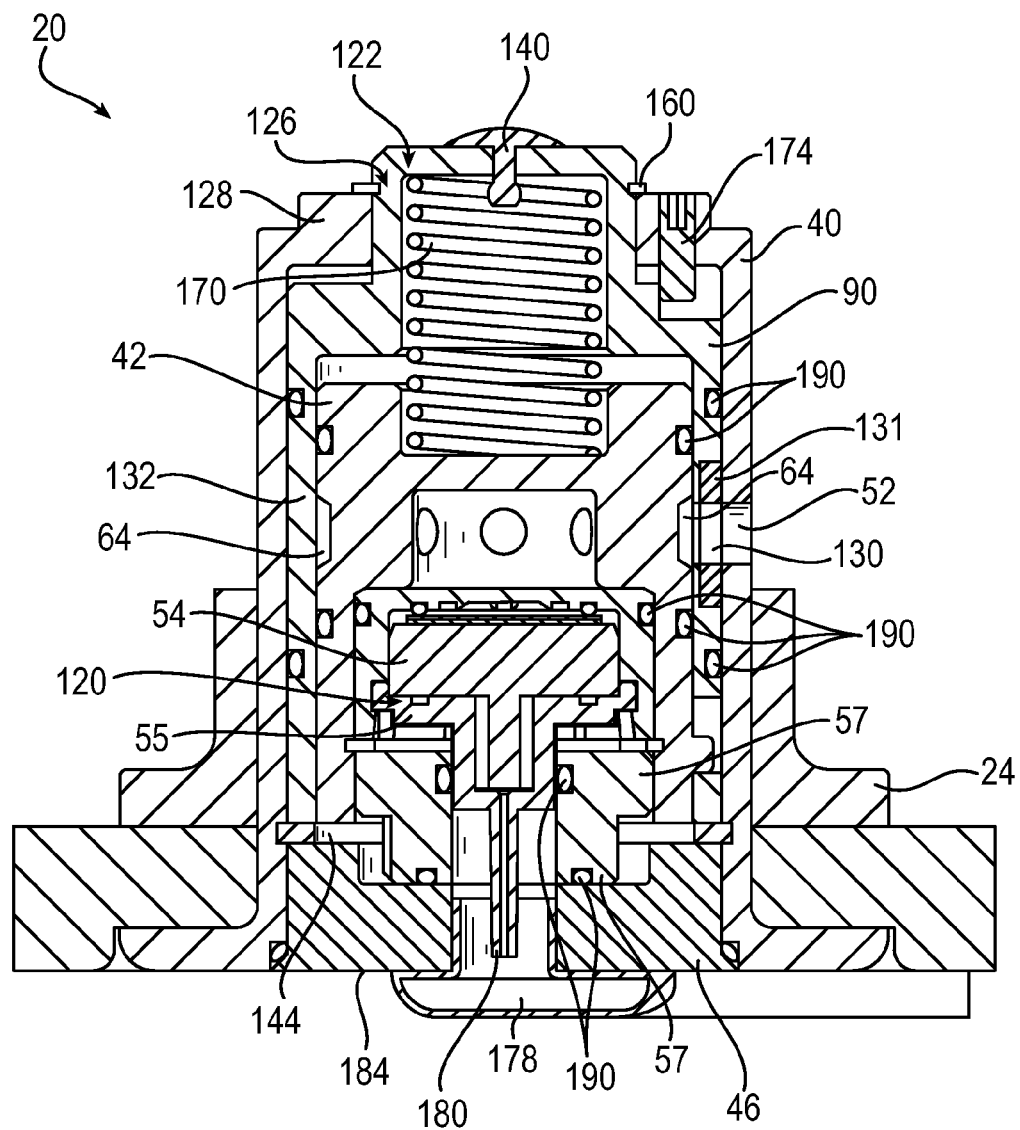
FIG. 4 is a cross-section view of a third embodiment of the sensor assembly.
Figure 5:
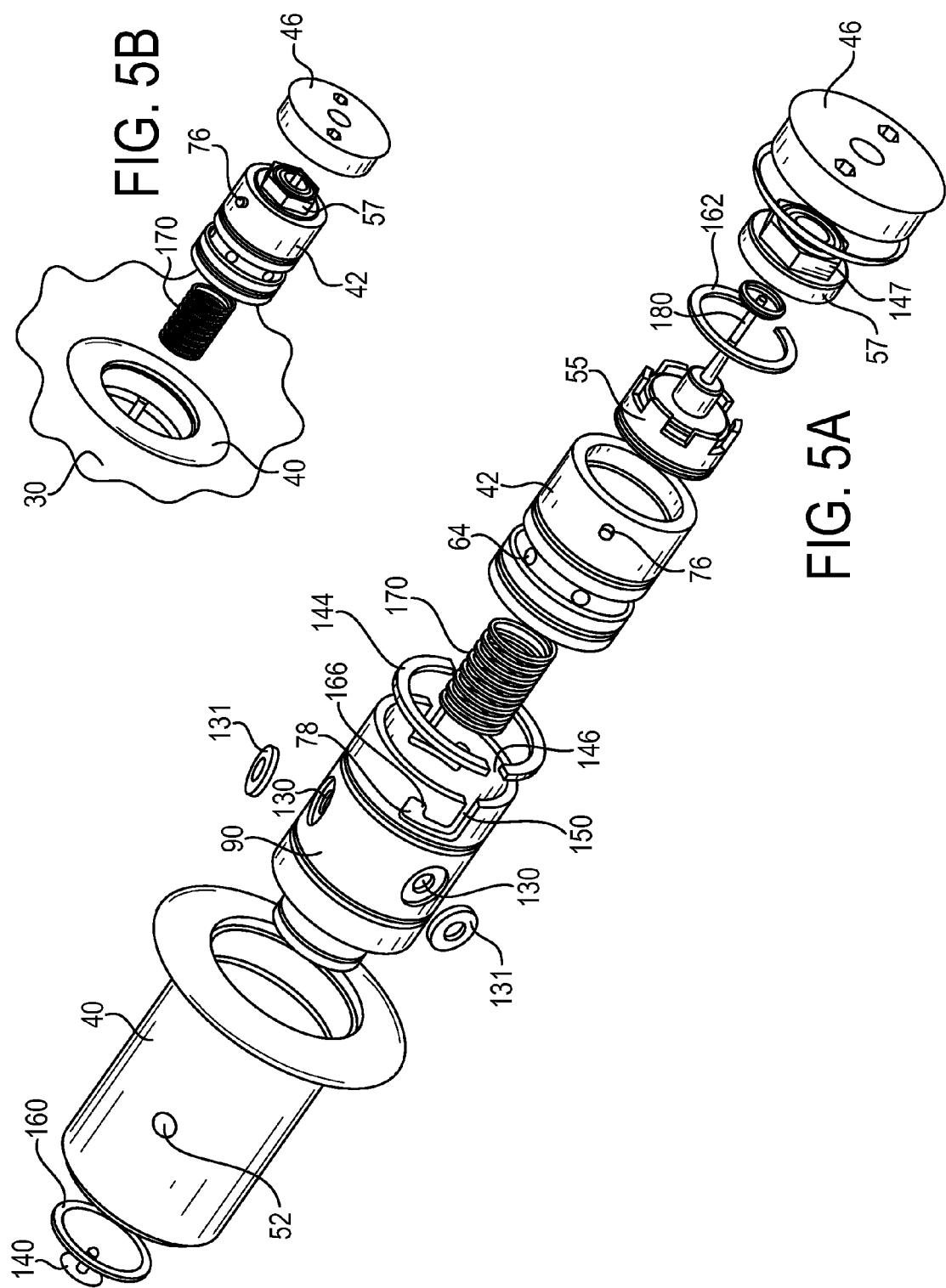
FIG. 5A is an exploded view of the sensor assembly of FIG. 4.
FIG. 5B is a view of the sensor assembly of FIG. 4 positioned to be inserted into a housing of the sensor assembly.

A third embodiment of the sensor assembly 20 is shown in FIGS. 4, 5A, and 5B. The sensor assembly 20 shown in FIG. 4 includes a stator 90 disposed within the housing 40 that is rotatable between a closed position and an open position (FIG. 4). The stator 90 includes a central cavity 120 configured to receive the cartridge 42 and a stator aperture 130 through a sidewall 132 of the stator 90. The stator may comprise a cylinder with multiple radially spaced stator apertures 130. Each stator aperture 130 may be surrounded by a seal 131. The seals 131 may be configured to prevent leakage between the housing 40 and the stator 90. The seals 131 may be located within a recess surrounding each stator aperture 130 in an exterior surface of the stator 90.

The stator may include a portion 122 projecting outwardly into the interior cavity 34 through an opening 126 in an end wall 128 of the housing 40. The stator 90 may be retained in the housing 40 by a circlip 160 or other retaining device.

The stator aperture is located such that, in the open position (FIG. 4), the stator aperture 130 is in alignment with the housing aperture 52 and a flow path is established between the interior cavity 34 and the stator central cavity 120. In the closed position, the stator aperture 130 is located so that it is out of alignment with the housing aperture 52. That is, in the closed position, the flow path between the interior cavity 34 and the stator central cavity 120 through the stator aperture 130 and the housing aperture 52 is blocked.

In this embodiment, the at least one cartridge aperture 64 is positioned to be aligned with the stator aperture 130 such that a flow path is established through the stator aperture 130 between the housing interior space 50 and the sensor 54 located within the cartridge central recess 120.

As shown in FIG. 4, the stator 90 may additionally include a vent valve 140 positioned along the portion 122 of the stator 90 projecting outwardly through the opening 126 in the end wall 128 of the housing 40. The vent valve 140 is configured to allow air within the housing 40 to vent through the vent valve 140. For example, inserting the cartridge 42 into the housing 40 may trap air within the housing 40. The vent valve 140 allows this air to be vented into the interior cavity 34. This, e.g., prevents the build-up of pressure within the cartridge 42 that could interfere with placing the cartridge 42 into the housing 40. The vent valve 140 may comprise one or more umbrella valves or any other suitable valves.

The sensor 54 may be contained within a sensor housing 55. As discussed later, the sensor housing 55 may be retained in the cartridge 42 by a cartridge cap 57.

Turning to FIGS. 5A and 5B, in this embodiment, the base retaining device 44 retains both the stator 90 and the cartridge 42 within the housing 40. In addition to the bayonet pin 76 and slot 78 described regarding the previous embodiments, the base retaining device also includes a split ring 144 having a split 146. In the removal position, the bayonet pin 76 aligns with an opening 150 in the slot 78 and the split 146 in the split ring 144, allowing the cartridge 42 to be removed from the housing 40. The sensor 54 may be secured within the cartridge 42 via a circlip 162 or any other suitable means.

Turning to FIGS. 6 and 7A-7E, rotation of the stator 90 within the housing 40 in order to close the flow path from the interior cavity 34 into the sensor assembly 20 and removal of the cartridge 42 from the housing 40 is shown. Rotation of the stator 90 and cartridge 42 is shown in the figures as occurring in the counter-clockwise direction. As will be understood by one of ordinary skill in the art, rotation in this direction is only being used as an example and other rotation directions are covered by this disclosure.

Figure 6:
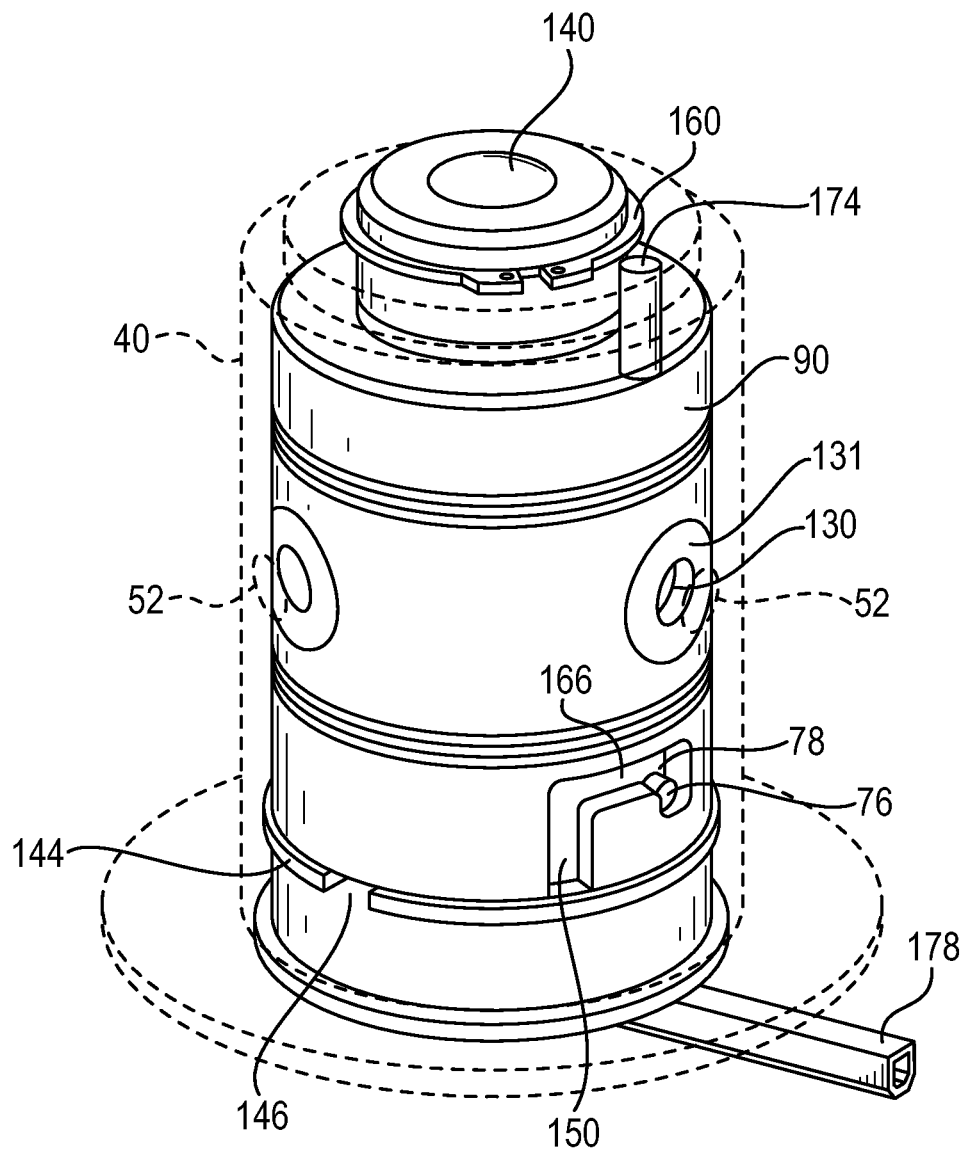
FIG. 6 is a partially transparent view of the sensor assembly of FIG. 4.

As shown in FIGS. 6 and 7A, during normal operation, the flow path between the interior cavity 34 and the sensor 54 through the housing aperture 52 and the stator aperture 64 is open. This flow path allows, e.g., the hydrostatic pressure of fluids in the interior cavity 34 to act on the sensor 54. The split ring 144 prevents the cartridge 42 from being removed before the flow path from the interior cavity 34 is closed.

Turning to FIG. 7A, when the cartridge 42 is positioned in the flow position, the stator is located in the open position. As shown in the figure, the bayonet pin 76 is seated in a bayonet groove 166 of the slot 78, which prevents the cartridge 42 from being rotated with respect to the stator. The sensor assembly 20 may additionally include compression member 170 positioned between the stator 90 and the cartridge 42. The compression member 170 is configured to bias the cartridge 42 away from the end wall 122 of the housing 40 and toward the base retaining device 44. For example, the compression member 170 may comprise a spring that provides force on the cartridge to prevent the bayonet pin 76 from coming loose from the groove 166 in the stator 90.

In FIG. 7A in order to rotate the cartridge 42, the cartridge must first be moved towards the end wall 128 of the housing 40. As shown in FIG. 7B, moving the cartridge 42 in this direction unseats the bayonet pin 76 from the bayonet groove 166. As shown in FIG. 7C, this allows the cartridge 42 to be rotated relative to both the stator 90 and the housing 40.

In FIG. 7C, the cartridge 42 has been rotated counter-clockwise until the bayonet pin 76 touches a left edge of the slot 78. In this position, the cartridge 42 is prevented from being removed from the stator 90 by the split ring 144. That is, because the opening in the slot 150 is not aligned with the split 146 in the split ring 144, the bayonet pin 76 is blocked by the split ring 144 from passing out of the slot 78. This prevents removal of the cartridge 42 at this position. In order to remove the cartridge 42, the stator 90 must be rotated.

Turning to FIG. 7D, further rotation of the cartridge 42 causes the stator 90 to rotate with the cartridge 42. That is, as the cartridge 42 is rotated from the flow position (FIG. 7A) towards the removal position (FIG. 7D), the stator 90 is rotated along with the cartridge 42 such that the stator 90 reaches the closed position and (FIG. 7D). Prior to the cartridge reaching the removal position (FIG. 7D), the flow path between the interior cavity 34 and the stator central cavity 120 through the stator aperture 64 and the housing aperture 52 may not be blocked. Rotation of the stator 90 may be caused by the bayonet pin 76 pushing against the edge of the split 78, causing the stator 90 to rotate. Rotation of the stator 90 closes the flow path from the interior cavity 34 to the sensor 54. For example, as shown in the figure, the stator 90 rotates relative to the housing 40 such that the housing aperture 52 and the stator aperture 64 are no longer aligned, closing the flow path. In order to remove the cartridge 42 from the housing 40, the cartridge 42 is rotated until the opening 150 in the slot 78 is aligned with the split 146 in the split ring 144.

With further reference to FIG. 6, the housing 40 may include a stop 174 to limit a rotational range of the stator 90 with respect to the housing 40. The stop 174 is positioned within a top groove 176 of the stator 90. In one embodiment, the stop 174 limits the rotation of the stator to a 60° angle defined by the groove 176 at the top of the stator 90. As will be understood by one of ordinary skill in the art, the stop 174 is not restricted to limiting the rotation of the stator to a 60° angle, but may limit the rotation of the stator to any angle. The stop 174 and the groove 176 may function to limit the rotational range of the stator 90 such that at one end of the rotational range, the stator 90 reaches the closed position and the opening 150 in the slot 78 is aligned with the split 146 in the split ring 144.

Figure 7E:
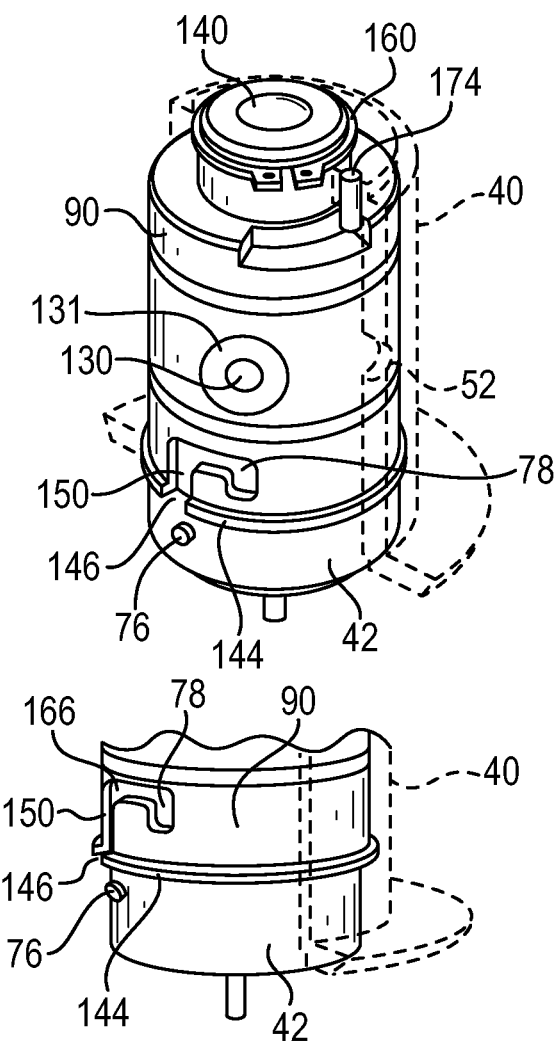
Figure 9:
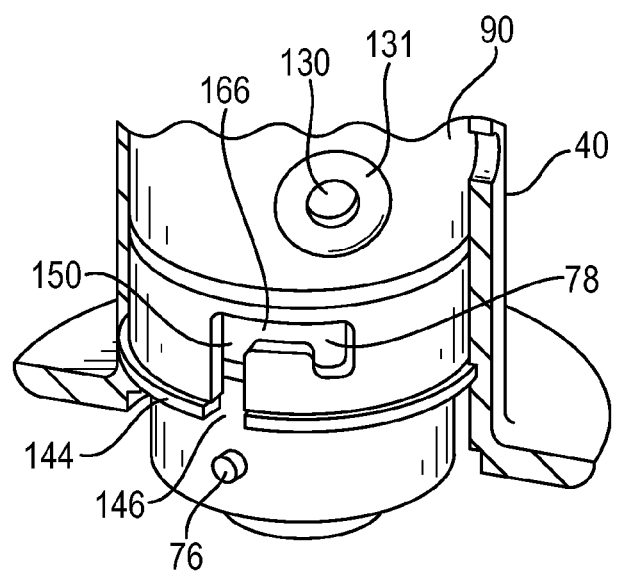
FIG. 9 is a partial cross-section view of the sensor assembly of FIG. 4.

Turning to FIG. 7E and 9, once the opening 150 in the slot 78 is aligned with the split 146 in the split ring 144 (FIG. 7D), the cartridge 42 may be removed from the stator 90. In the figure, the cartridge is pulled downwards to remove the cartridge 42 from the housing 40.

Rotation of the cartridge 42 may be facilitated by a handle or knob 147 bonded to the cartridge cap 57. In this example, an O-Ring 190 may be used to prevent leakage between the cartridge cap 57 and the sensor 54.

Prior to removing the cartridge as described in regards to FIGS. 7A-7E above, a user may first be required to remove the wiring protective cover 178 and the end cap 46. The sensor 54 may output data via a data connection. The data connection may comprise a wired connection 180 or a wireless connection. The wired connection 180 may include a transmission wire passing directly from the sensor assembly 20 to the interior cavity 34 or the exterior 32. The wired connection 180 may comprise a cable, electric wire, fibre optic, etc. The data connection may be shielded to prevent any damage and to fulfil safety requirements.

Figure 8A:
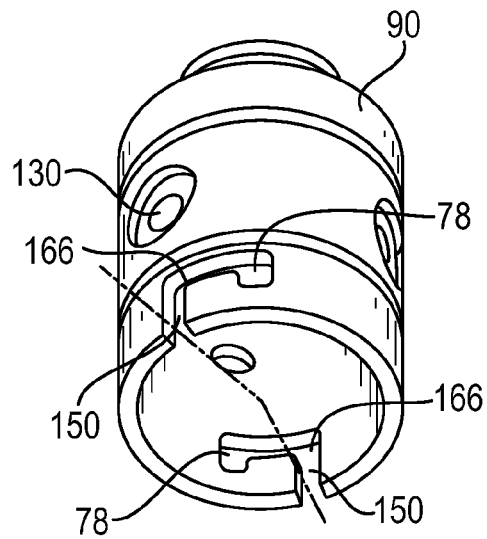
FIGS. 8A and 8B are external views of the housing of the sensor assembly of FIG. 4.
Figure 8B:
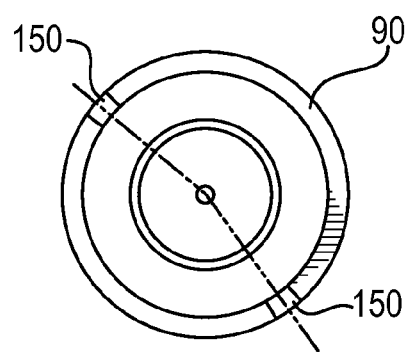

As shown in FIG. 8A and 8B, the stator 90 may include two separate slots 78 for receiving two separate bayonet pins 76. The slots 78 may be asymmetric in order to prevent incorrect insertion of the cartridge 42 into the stator 90. In the figures, the slots 78 have a 165° angle between them. As will be understood by one of ordinary skill in the art, the slots 78 are not limited to two in number or this angle, but may include any suitable number of slots and have any suitable angle between each of them. The angle between the slots 78 may be chosen to be wide enough such that the slots 78 support the cartridge 42 (via the bayonet pins 76) from both sides while also being clear to the operator that the slots 78 are not symmetric. The asymmetric appearance of the slots 78 may provide reassurance that the cartridge 42 installation has been correctly performed.

Figure 10:
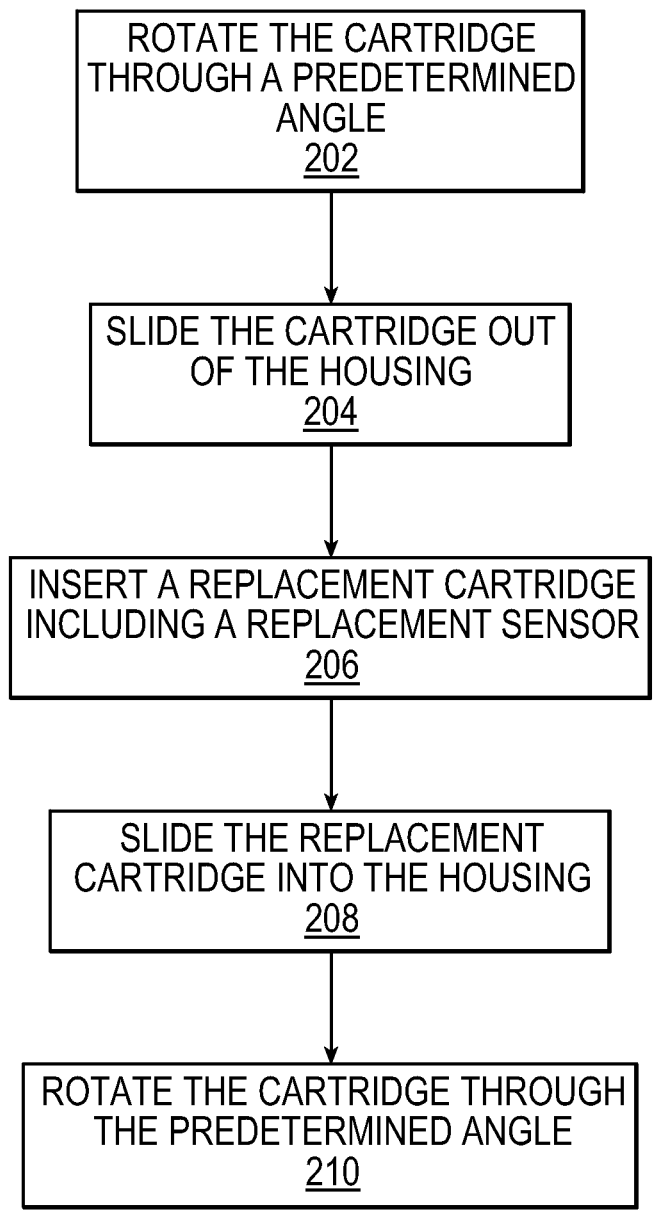
FIG. 10 is a flow diagram depicting a method for replacing a fuel level sensor in a sensor assembly.

Turning to FIG. 10, a method for replacing a sensor assembly is described. In process block 202, the cartridge 42 of the sensor assembly 20 is rotated through a predetermined angle within the housing 40 retaining the cartridge 42. The cartridge 42 is rotated such that the bayonet pin 76 located on an exterior surface of the cartridge 42 aligns with the opening 150 in the slot 78 located on an interior surface of the housing 40.

In process block 204, the cartridge 42 is slid out of the housing 40 such that a flow path between the interior cavity 34 and the sensor 54 through an aperture 52 in the housing 40 is blocked. In process block 206, a replacement cartridge 42 including a replacement sensor 54 is inserted into the housing 40 such that a replacement bayonet pin 76 located on an exterior surface of the replacement cartridge 42 aligns with the opening 150 in the slot 78 located on the interior surface of the housing 40.

In process block 208, the replacement cartridge 42 is slid into the housing 40 such that the flow path between the interior cavity 34 and the sensor 54 through the aperture 52 in the housing 40 is established. In process block 210, the replacement cartridge 42 is rotated through the predetermined angle within the housing 40 such that the position of the replacement cartridge 42 within the housing 40 is maintained by the replacement bayonet pin 72.

The sensor assembly 20 may include one or more seals 190 to prevent the leakage of fluids throughout and into the sensor assembly 20. In the first embodiment, e.g., the sensor assembly 20 may include seals 190 between the housing 40 and the cartridge 42 as shown in FIG. 2A. Seals 190 may also be located between the sensor 54, the sensor housing 55, and the cartridge 42. In the second embodiment, e.g., seals 190 may be located between the poppet 70 and the housing 40, the push bar 110 and the housing, the push bar 110 and the stator 90, the stator 90 and the housing 40, the cartridge 42 and the housing 40, and the cartridge 42 and the sensor 54. In the third embodiment, e.g., seals 190 may be located between the stator 90 and the housing 40, the cartridge 42 and the stator 90, the sensor housing 55 and the cartridge 42, the sensor housing 55 and the sensor 54, the cartridge cap 57 and the cartridge 42, the cartridge cap 57 and the sensor housing 55, and the end cap 46 and the housing 40. As will be understood by one of ordinary skill in the art, seals 190 may be included at additional or alternative locations, e.g., based on design, manufacturing, and/or cost considerations. The seals 190 may comprise different types of seals. For example, the seals 190 may include O-ring seals located in grooves on different components of the sensor assembly 20.

Figure 11:
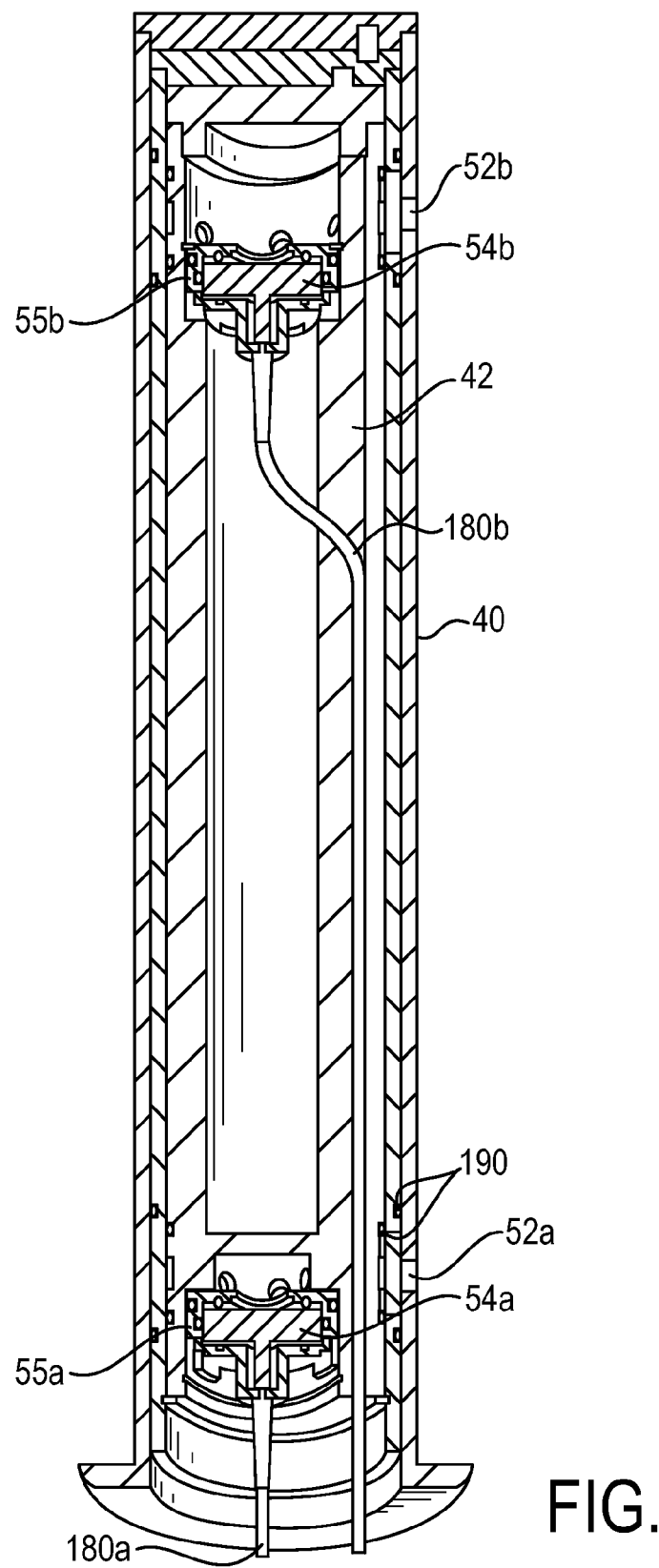
FIG. 11 is a fourth embodiment of the sensor assembly including two sensors.

An exemplary two sensor assembly is shown in FIG. 11. The two sensors in the sensor assembly 20 are separated by a known vertical distance. Some applications may require co-location of multiple sensors. This may be desirable for cross-comparison of sensor readings to increase integrity of the measured parameter or to provide redundancy. In such cases, it may be necessary to ensure that the separation of the two sensors is tightly controlled during manufacture. While the majority of the figures correspond to a single sensor assembly, a dual sensor assembly may have the same components, with the difference that the cartridge 40 contains a separate chamber for the second pressure sensor, with additional housing apertures as shown in FIG. 11. It is also possible to extend this arrangement to accommodate more than two sensors within a single cartridge.

As will be understood by one of ordinary skill in the art, the components of the sensor assembly 20 may be made of any suitable materials. For example, the components could be made of any of plastic, metal (e.g., aluminium), ceramic, composite material or elastomer. In another example, the components may be metal free.

What is claimed is:

1. A sensor assembly for installation within an opening in a wall separating an interior cavity from an exterior, the sensor assembly comprising:
  a housing including an interior space, the housing configured to be received within the opening in the wall such that at least one housing aperture in a wall of the housing communicates with the interior cavity, wherein the housing aperture is configured such that:
    a flow path through the housing aperture between the interior cavity and the housing interior space is blocked when a cartridge is not positioned within the housing interior space; and
    the flow path through the housing aperture between the interior cavity and the housing interior space is established when the cartridge is positioned in a flow position within the housing interior space;
  the cartridge configured to be received within the housing and including:
    a sensor supported within a central recess of the cartridge and disposed within the housing interior space when the cartridge is positioned within the housing interior space; and
    at least one cartridge aperture positioned such that a flow path through the cartridge aperture is established between the housing interior space and the sensor when the cartridge is positioned within the housing interior space;
  a base retaining device configured to retain the cartridge within the housing; and
  a stator disposed within the housing and rotatable between a closed position and an open position, the stator including:
    a central cavity; and
    a stator aperture through a sidewall of the stator, the stator aperture located such that:
      in the open position, the stator aperture is in alignment with the housing aperture such that a flow path is established between the interior cavity and the stator central cavity; and
      in the closed position, the stator aperture is out of alignment with the housing aperture such that the flow path between the interior cavity and the stator central cavity through the stator aperture and the housing aperture is blocked;
  wherein the stator central cavity is configured to receive the cartridge; and
  wherein the at least one cartridge aperture is positioned to be aligned with the stator aperture such that a flow path is established through the stator aperture between the housing interior space and the sensor located within the cartridge central recess;
  wherein the base retaining device comprises:
    a split ring including a split;
    a bayonet pin located along an exterior surface of the cartridge; and
    a slot positioned on an interior surface of the stator and configured to receive the bayonet pin, the geometry of the slot configured to allow the cartridge to rotate through a predetermined angle within the stator, such that:
      in the flow position, the cartridge is retained within the housing; and
      in a removal position, the bayonet pin aligns with an opening in the slot and the split in the split ring, allowing the cartridge to be removed from the housing.

2. The sensor assembly of claim 1, further comprising:
  a seal located on an exterior surface of the stator and positioned to engage the housing, wherein the seal is configured to limit fluid flow between the interior cavity and the housing interior space to occurring through the stator aperture.

3. The sensor assembly of claim 1, wherein the stator additionally includes at least one vent valve positioned along a portion of the stator projecting outwardly through an opening in an end wall of the housing and the vent valve is configured to allow air within the housing to vent through the vent valve.

4. The sensor assembly of claim 1, wherein the sensor assembly is configured such that:
   when the cartridge is positioned in the flow position, the stator is located in the open position; and
   as the cartridge is rotated from the flow position towards the removal position, the stator is rotated along with the cartridge such that the stator reaches the closed position and, prior to the cartridge reaching the removal position, the flow path between the interior cavity and the stator central cavity through the stator aperture and the housing aperture is blocked.

5. The sensor assembly of claim 1, further comprising a compression member positioned between the stator and the cartridge, the compression member configured to bias the cartridge away from an end wall of the housing and toward the base retaining device.

6. The sensor assembly of claim 1, wherein the housing includes a stop to limit a rotational range of the stator with respect to the housing.

7. The sensor assembly of claim 1, wherein the sensor outputs data via a wired connection, wherein the wired connection includes a transmission wire passing directly from the sensor assembly to the interior cavity or the exterior.

8. The sensor assembly of claim 1, wherein:
   a position of the housing within the opening in the wall separating the interior cavity and the exterior is maintained by a fastener; and
   an exterior surface of the housing is threaded and configured to engage with a threaded interior surface of the fastener.

9. The sensor assembly of claim 1, further comprising an end cap, wherein the end cap is configured to cover the opening in the wall when inserted such that an exterior surface of the end cap and the wall are essentially flush.

10. An aircraft comprising a fuel tank and the sensor assembly of claim 1 installed in an opening in a wall of the fuel tank separating an interior cavity of the fuel tank from an exterior of the fuel tank.

11. A sensor assembly used to measure a fuel quantity of an aircraft, the sensor assembly installed in an opening in a wall of an aircraft separating an interior cavity of an aircraft fuel tank from an exterior, the sensor assembly comprising:
   a cartridge;
   a housing including a housing interior space, the housing configured to be received within the opening in the wall such that at least one housing aperture in a wall of the housing communicates with the interior cavity, wherein the housing aperture is configured such that:
      a fluid flow path allowing fuel to pass from the interior cavity, through the housing aperture, and into the housing interior space is blocked when the cartridge is not positioned within the housing interior space; and
      the fluid flow path allowing fuel to pass from the interior cavity, through the housing aperture, and into the housing interior space is established when the cartridge is positioned in a flow position within the housing interior space;
   wherein the cartridge is configured to be received within the housing and includes:
      at least one pressure sensor supported within a central recess of the cartridge, wherein the at least one pressure sensor outputs pressure data regarding a pressure of fuel located within the aircraft fuel tank; and
      at least one cartridge aperture positioned such that a fluid flow path of fuel through the cartridge aperture is established between the housing interior space and the sensor when the cartridge is positioned within the housing interior space;
   a base retaining device configured to retain the cartridge within the housing; and
   an end cap, wherein the end cap is configured to cover the opening in the wall when inserted such that an exterior surface of the end cap and the wall are essentially flush;
   a stator disposed within the housing and rotatable between a closed position and an open position, the stator including:
      a central cavity; and
      a stator aperture through a sidewall of the stator, the stator aperture located such that:
         in the open position, the stator aperture is in alignment with the housing aperture such that a flow path is established between the interior cavity and the stator central cavity; and
         in the closed position, the stator aperture is out of alignment with the housing aperture such that the flow path between the interior cavity and the stator central cavity through the stator aperture and the housing aperture is blocked;
   wherein the stator central cavity is configured to receive the cartridge; and
   wherein the at least one cartridge aperture is positioned to be aligned with the stator aperture such that a flow path is established through the stator aperture between the housing interior space and the sensor located within the cartridge central recess;
   wherein the base retaining device comprises:
      a split ring including a split;
      a bayonet pin located along an exterior surface of the cartridge; and
      a slot positioned on an interior surface of the stator and configured to receive the bayonet pin, the geometry of the slot configured to allow the cartridge to rotate through a predetermined angle within the stator, such that:
         in the flow position, the cartridge is retained within the housing; and
         in a removal position, the bayonet pin aligns with an opening in the slot and the split in the split ring, allowing the cartridge to be removed from the housing.

* * * * *